Figure 1:
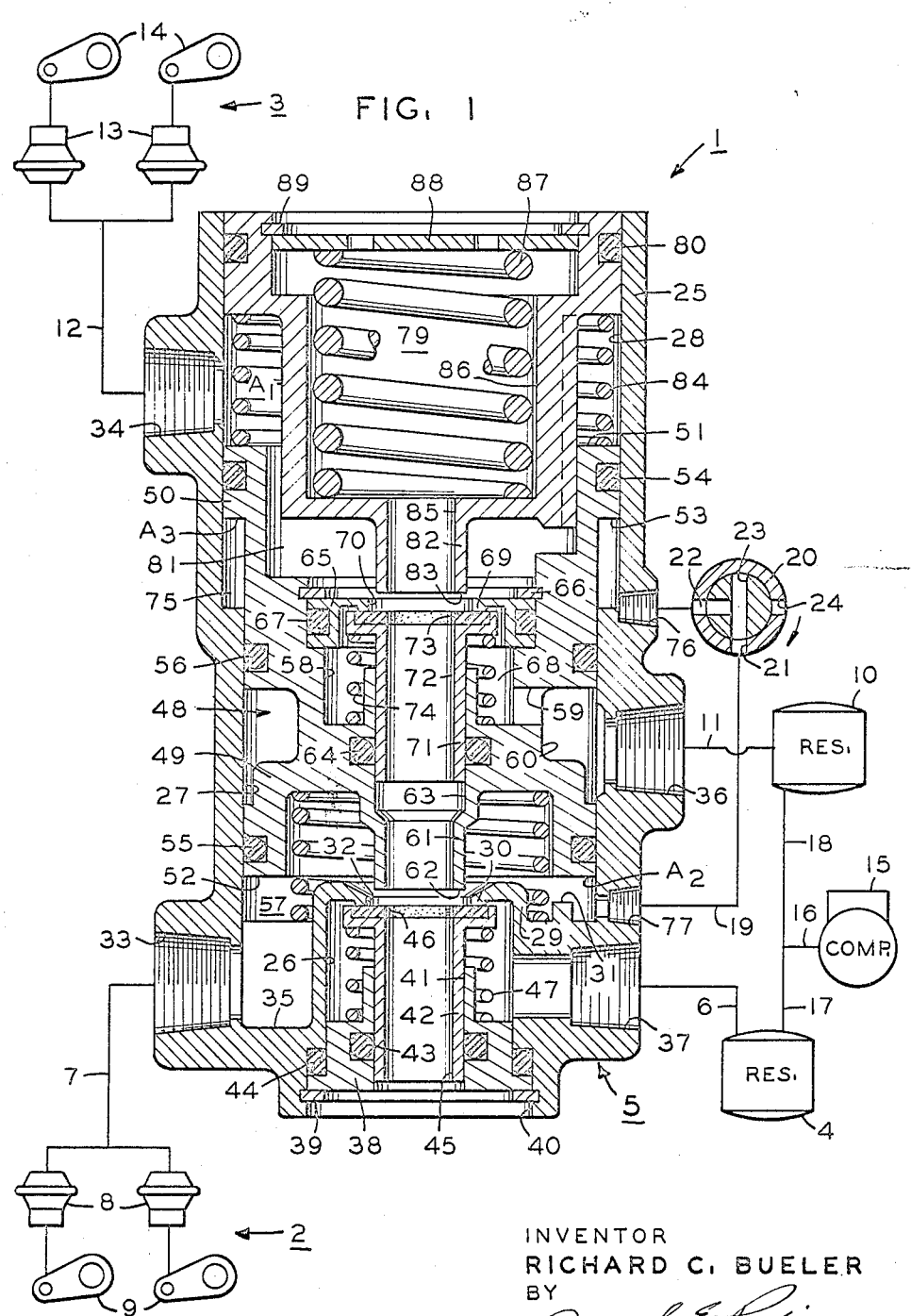

Sept. 21, 1965 R. C. BUELER 3,207,561
RATIO SELECTOR TYPE TANDEM CONTROL VALVE
Filed Aug. 19, 1963 3 Sheets-Sheet 1

INVENTOR
RICHARD C. BUELER
BY
*Joseph E. Papin*

Sept. 21, 1965  R. C. BUELER  3,207,561
RATIO SELECTOR TYPE TANDEM CONTROL VALVE
Filed Aug. 19, 1963  3 Sheets-Sheet 2

INVENTOR
RICHARD C. BUELER
BY

INVENTOR
RICHARD C. BUELER

United States Patent Office 3,207,561
Patented Sept. 21, 1965

3,207,561
RATIO SELECTOR TYPE TANDEM
CONTROL VALVE
Richard C. Bueler, Glendale, Mo., assignor to Wagner
Electric Corporation, St. Louis, Mo., a corporation of
Delaware
Filed Aug. 19, 1963, Ser. No. 302,953
14 Claims. (Cl. 303—52)

This invention relates to control valves and in particular to tandem control valves of the ratio selector type.

In the past, tandem control valves were provided with separate valving therein for controlling pressure fluid flow in separate fluid pressure systems, and the valving was actuated by separate valve control or actuating means which were interconnected by a yoke-type linkage, or the like, to an operator type treadle. One of the undesirable features of such past tandem control valves was that the reaction forces which provide "feel" as to the extent of the braking effort were each transmitted to the operator through the linkage from the actuating means. Another undesirable feature was that the "feel" varied appreciably upon failure of fluid pressure in one of the separate systems effecting variation in controllability which tended to confuse the operator. Another undesirable feature was that an appreciable lost stroke in the operator treadle also accompanied the failure of fluid pressure in one of the separate systems. Still another undesirable feature was that the control of the separate systems could not be sequenced, i.e., one system actuated substantially at the same time as the other system. And still another undesirable feature was the requirement of an intermediate connecting linkage between the actuating means and the operator treadle.

It is an object of the present invention to provide a tandem control valve which overcomes the aforementioned undesirable and objectionable features.

Another object of the present invention is to provide a tandem control valve for controlling the flow of fluid pressure in separate fluid pressure systems wherein the fluid pressure of the flow in said separate systems will be in a predetermined ratio.

These and still other objects and advantages will become more apparent hereinafter.

Briefly, the invention embodies a control valve mechanism and system wherein a pair of resiliently urged apart valve control members are movable in response to an applied force on one of said members to actuate a pair of valve means for controlling the application of fluid pressure from a pair of fluid pressure sources to a pair of servo motors, one of said valve control members having a separate area adapted to be connected with the atmosphere to provide a predetermined ratio between the fluid pressures applied to said servo motors or adapted to be connected with the fluid pressure applied to one of said servo motors to provide a ratio between the fluid pressures applied to said servo motors different than the predetermined ratio.

Figure 2:
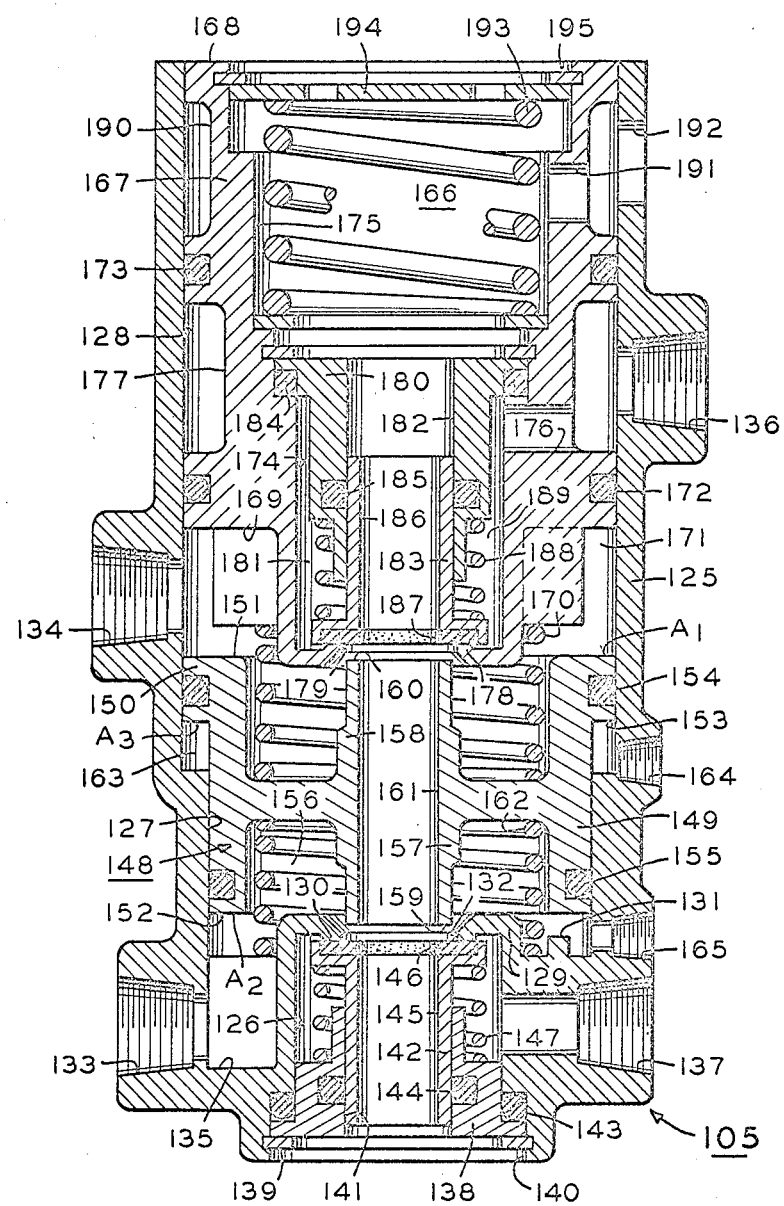
Figure 3:
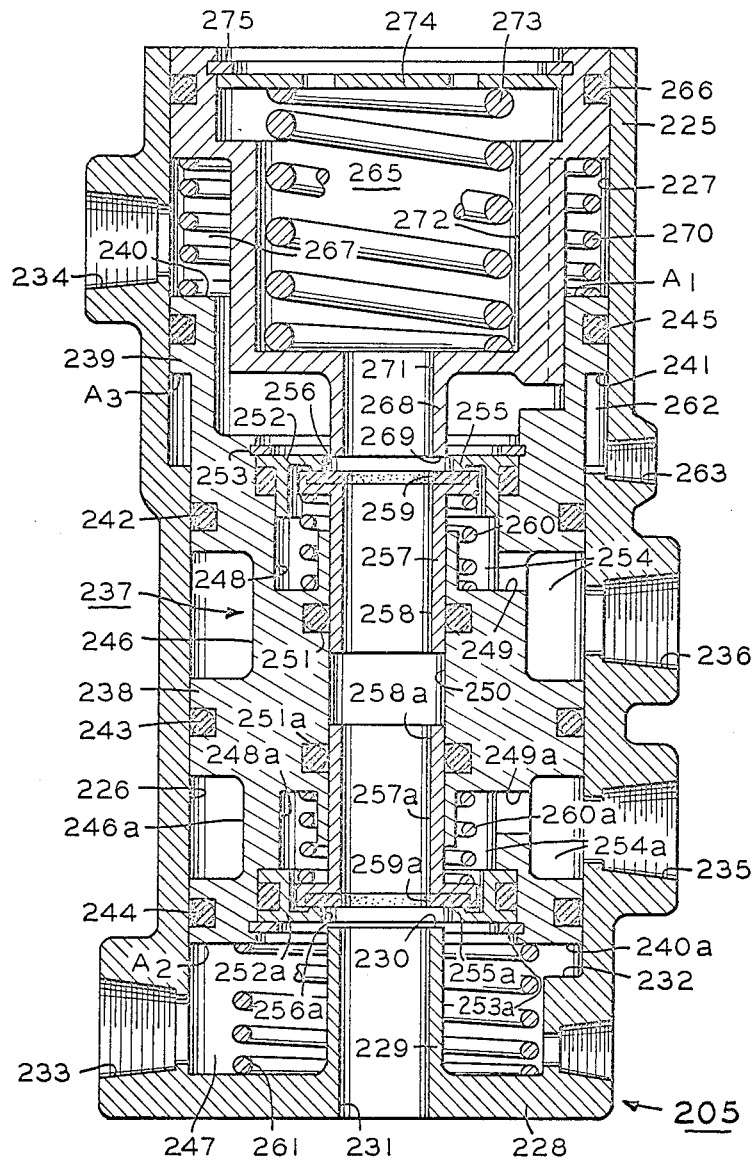

The invention also consists in the parts and arrangements and combinations of parts hereinafter described and claimed in the accompanying drawings which form a part of the specification and wherein like parts refer to like numerals wherever they occur:

FIG. 1 is a diagrammatic view of a fluid pressure system showing an embodiment of the present invention connected therein in cross section, and FIGS. 2 and 3 are other embodiments of the present invention shown in cross section and adapted to be connected in the system of FIG. 1.

Referring now to FIG. 1, a dual brake actuating system 1 is shown having separate fluid pressure branches, indicated generally at 2 and 3. The branch 2 includes a reservoir 4 for fluid pressure storage which is connected to one of a pair of separate inlet ports of a treadle operated control valve 5 by a conduit 6. The control valve or ratio selector valve 5 is also provided with a pair of separate outlet ports, a service line or conduit 7 connects one of said outlet ports with a set of fluid pressure responsive motors or brake chambers 8 which are linked with slack adjustors 9 to control energization of an axle set of vehicle brake assemblies (not shown). The branch 3 includes a reservoir 10 for fluid pressure storage which is connected to the other of the inlet ports of the control valve 5 by a conduit 11, and another service line or conduit 12 connects the other of the outlet ports of said control valve with another set of fluid pressure responsive motors or brake chambers 13 which are operatively linked with slack adjustors 14 to control the energization of another axle set of vehicle brake assemblies (not shown). A compressor 15 is connected with reservoirs 4 and 10 by a conduit 16 which branches at 17 and 18, said compressor and separate reservoirs forming in combination separate fluid pressure sources. To complete the system 1, another conduit 19 is connected between a pair of control or ratio ports which are provided in the control valve 5 and a two-way ratio or hand valve 20 is provided with charging ports 21 and 22 serially connected in the conduit 19. Rotatable passage means 23 in the ratio valve 20 normally provides open pressure fluid communication between the ratio ports through the conduit 19; however, said passage means may be rotated clockwise (in the direction of the arrow) to position the passage means 23 between the outlet 22 and an exhaust 24 thereby interrupting communication between the control ports and venting one of the control ports to the atmosphere.

The tandem control valve 5 is provided with a housing 25 having an axial bore 26 and stepped counterbores 27 and 28 therein, said bore 26 forming an inlet chamber. A radially extending wall 29 is integrally formed in the housing 25 between bore 26 and counterbore 27 having a valve seat 30 thereon in said bore and a piston stop 31 thereon in said counterbore, and a connecting passage 32 extends coaxially through the valve seat 30 between said bore and counterbore. Outlet ports 33 and 34 which receive the conduits 7 and 12, respectively, as previously mentioned, are provided in the housing 25 adjacent to the lower end of the counterbore 27 and adjacent to the upper end of the counterbore 28, and a passage 35 is provided in said housing connecting the outlet port 33 with the counterbore 27. An inlet port 36 which receives the conduit 11, as previously mentioned, is provided in the housing 25 connecting with counterbore 27 in the midportion thereof and spaced between the outlet ports 33 and 34, and another inlet port 37 which receives the conduit 6, as previously mentioned, is provided in said housing connecting with the bore 26. As will become apparent hereinafter, inlet and outlet ports 37 and 33 form one separate set of ports, and inlet and outlet ports 36 and 34 form another separate set of ports.

A valve guide member 38 is positioned in the bore 26 against displacement by a snap ring and groove assembly 39 provided adjacent the lower end of said bore, and the lower end of said bore forms an exhaust port 40. The valve guide member 38 is provided with a bore 41 in which an inlet valve element 42 is slidable, and seals 43, 44 are carried by said valve guide member in sealing engagement with said bore and said inlet valve element, respectively. The inlet valve element 42 is provided with an axial bore or exhaust opening 45 and has an annular resilient seal or disc 46 on the upper end thereof in circumscribing relation with said exhaust opening. A spring 47 is provided between the valve guide member 38 and the valve 42 and normally urges the valve seal 46 into sealing engagement with the valve seat 30 on the housing wall 29.

A piston or valve control member, indicated generally at 48, is provided with a body 49 slidable in the counterbore having an integral radially extending flange 50 slidable in the counterbore 28, said piston being positioned between the port sets 33, 37 and 34, 36. Upper and lower ends 51 and 52 of the piston 48 define opposed effective areas $A_1$ and $A_2$, and a shoulder 53 on the flange 50 defines an effective area $A_3$ which is the difference between areas $A_1$ and $A_2$, said area $A_3$ being opposed to the area $A_1$ and additive to the area $A_2$. A seal 54 is carried in flange 50 in sealing engagement with the counterbore 28, and seals 55, 56 are carried in the piston body 51 adjacent the lower end 52 thereof and adjacent the mid-portion thereof, respectively, and said seals 55, 56 being in sealing engagement with the counterbore 27. An outlet or reaction chamber 57 is formed in the counterbore 27 between the housing wall 29 and the piston lower end 52 in open pressure fluid communication with the passage 35 and the outlet port 33, and said outlet chamber is normally exhausted to atmosphere through the valve exhaust opening 45 and the exhaust port 40. The piston 48 is provided with a centrally located stepped bore 58 which is connected by passage 59 with an annular recess 60 provided in the peripheral surface of said piston body between the seals 55 and 56, and said annular recess is in open pressure fluid communication with the inlet port 36 at all times. An integral extension 61 is integrally provided on the piston lower end 52 having a valve seat 62 on the free end thereof for cooperative engagement with the valve 42. An axial passage or valve guide bore 63 which connects with the lower end of the piston stepped bore 58 extends coaxially through the valve seat 62 and extension 61, and a seal 64 is positioned in said valve guide bore. A wall or seating member 65 is positioned in the piston stepped bore 58 against displacement by a snap ring and groove assembly 66 provided adjacent the upper end of said stepped bore, and a seal 67 is carried in said wall member in sealing engagement with said stepped bore. Another inlet chamber or valve chamber 68 is formed in the piston stepped bore 58 between the lower end wall thereof and the wall member 65 and includes the passage 59 and peripheral recess 60, said inlet chamber being in open pressure fluid communication with the inlet port 36 at all times. A valve seat 69 is provided in the inlet chamber 68 on the wall member 65, and a connecting passage 70 in said wall member extends coaxially through said valve seat. Another inlet valve element 71 is slidably received in the valve guide bore 63 in sealing engagement with the seal 64 therein. The inlet valve element 71 is provided with an axial bore or exhaust opening 72 therethrough and has an annular resilient sealing member or disc 73 on the upper end thereof in circumscribing relation with said exhaust opening. A valve spring 74 is provided between the piston body 49 and the valve 71 and normally urges the valve seal 73 into sealing engagement with the valve seat 69 formed on the wall member 65.

A ratio or control chamber 75 is provided in the counterbore 28 between the side wall thereof and the piston body 49 and between the shoulder formed between counterbores 27, 28 and the piston flange shoulder 53. A ratio or control port 76 which receives one end of the conduit 19, as previously mentioned, is provided in the housing 25 in open pressure fluid communication with the ratio chamber 75 at all times, and another ratio port 77 which receives the other end of said conduit 19 is provided in the housing 25 in open pressure fluid communication with the outlet chamber 27. A return spring 78 is interposed between the piston lower end 52 and the housing wall 29 and normally maintains the piston extension seat 62 in predetermined spaced relation with the inlet valve seal 46.

Another piston or valve control member 79 is slidably received in the upper end of the housing counterbore 28, and a seal 80 is carried by said piston in sealing engagement with said counterbore. Another outlet or reaction chamber 81 is formed in the housing counterbore 28 between the upper end 51 of the piston 48 and the position 79 in open pressure fluid communication with the outlet port 34. The piston 79 is provided with an extension 82 having a valve seat 83 on the lower or free end thereof which is coaxial with the connecting passage 70 in the wall member 65, and said valve seat is normally maintained in spaced relation with the inlet valve seat 73 by a return spring 84 biased between the upper end 51 of the piston 48 and the piston 79, said return spring normally urging the piston 79 away from the piston 48 to its normal released or inoperative position as shown. An exhaust passage or opening 85 extends coaxially through the valve seat 83 and connects with a stepped bore 86 in the piston 79. To complete the control valve 5, a precompressed metering spring 87 is provided in the stepped bore 86 and biased between the piston 79 and a retainer or treadle force receiving plate 88. The treadle plate 88 is slidable in the stepped bore 86 of the piston 79, and said treadle plate and the metering spring 87 are retained against displacement from said stepped bore by a snap ring and groove assembly 89 provided adjacent to the upper end of said stepped bore.

In the operation of the above described control valve 5 in the system 1, it is preferred to predetermine substantially simultaneous actuation of the system branches 2 and 3 by effecting substantially simultaneous actuation or opening of the valves 42 and 71 which control said branches. This is accomplished by substantially balancing the magnitudes of the combined forces of the valve and return springs 47 and 78 and the seating force of the fluid pressure in the inlet chamber 26 acting to maintain the valve 42 in engagement with the seat 30 against the magnitudes of the combined forces of the valve and return springs 74 and 84 and the seating force of the fluid pressure in the inlet chamber 68 acting to maintain the valve 71 in engagement with the seat 69.

Assuming the abovementioned combined forces which control the sequence of operation of the valves 42 and 71 are balanced and that the hand valve 20 is positioned to communicate the ratio ports 76 and 77, as above described, a manual force applied by the operator on the force receiving plate 88 of the piston 79 moves said piston downwardly against the compressive force of the return spring 84 to engage the seat 83 with the valve 71 closing the exhaust opening 72 and exhaust passage 85 to isolate the outlet chamber 81 from the atmosphere. At the same time, the manual force is transmitted through the return spring 84 to effect the substantially simultaneous downward movement of the piston 48 against the return spring 78 to engage the seat 62 on the piston extension 61 with the valve 42 closing the exhaust opening 45 and the valve guide bore 63 to isolate the outlet chamber 57 from the atmosphere. Further concert downward movement of the pistons 48 and 79 effects substantially simultaneous disengagement of the valves 42 and 71 from the seats 30 and 69 to establish pressure fluid communication between the inlet and outlet ports 37 and 33 and between the inlet and outlet ports 36 and 34, respectively. The pressure fluid flows in the system branch 2 from the reservoir 4 through the conduit 6, the inlet port 37, the inlet chamber 26, the connecting passage 32, the outlet chamber 57 and the passage 35 to the outlet port 33 and therefrom through the conduit 7 to actuate the brake chambers 8 which, in turn, rotate slack adjustors 9 to energize the axle set of wheel brake assemblies associated therewith. Pressure fluid also flows in the system branch 3 from the reservoir 10 through the conduit 11, the inlet port 37, the inlet chamber 68, the connecting passage 70, the outlet chamber 81 to the outlet port 34 and therefrom through the conduit 12 to actuate the brake chambers 13 which, in turn, rotate slack adjustors 14 to energize the axle set of wheel brake assemblies associated therewith. In addition to the above, pressure fluid simultaneously flows from the outlet chamber 57 through the ratio port 77, the conduit 19, the connecting ports 21 and 22 of the hand valve 20 through the passage means 23 therein, the ratio port 76 and into the ratio chamber 75. The fluid pressure in the ratio chamber acts on the piston area $A_3$ and the fluid pressure in the outlet chamber 57 acts on the additive piston area $A_2$ creating a reaction force substantially equal and opposite to that created by the fluid pressure in the outlet chamber 81 acting on the piston area $A_1$; therefore, the opposed reaction forces acting on the piston 48 are self-cancelling. In this manner, the ratio between mangitudes of the fluid pressure delivered to the motors 8 and 13 is predetermined, and said magnitudes of the delivered fluid pressures are substantially equal.

When the reaction force created by the established fluid pressure in the outlet chamber 81 acting on the effective area of the piston 79 equals the manually applied force, the piston 79 is moved upwardly against the metering spring 87, and the force of the return spring 78 effects concert upward movement of the piston 48 therewith. This upward movement of the pistons 48 and 79 positions the valves 42 and 71 in lapped engagement with their seats 30 and 69 and position the piston seats 62 and 83 in lapped engagement with said valves. The reaction force acting through the metering spring 87 and plate 88 against the applied force is substantially equal and opposite thereto and affords the operator an accurate and direct "feel" as to the extent of the braking application or effort. If greater braking effort is desired, the manually applied force is increased, and the component parts of the control valve 5 function in the same manner, as above described, to again move said component parts to their lapped positions.

When the desired braking effort is attained, the manually applied force is removed from the piston 79, and return springs 78 and 84 and the reaction forces move pistons 48 and 79 upwardly toward their original positions. This upward movement of the pistons 48 and 79 disengages their seats 62 and 83 from the valves 42 and 71 opening the exhaust openings 45 and 72 therein along with the valve guide bore 63 of the piston 48 and the exhaust passage 85 of the piston 79 to re-establish communication between the outlet chambers 57 and 81 and the atmosphere. In this manner, the fluid pressure in the ratio chamber 75 is vented to atmosphere at the same time through the ratio port 76, the conduit 19, the ports 22, 21 and passage means 23 of the hand valve 20, and the ratio port 77 into the outlet chamber 57 and therefrom to atmosphere through the valve exhaust opening 45 and the exhaust port 40. The wheel brake assemblies associated with the motors 8 are de-energized and the reaction forces are eliminated by exhausting fluid pressure from said motors through the conduit 7, the outlet port 33 into the outlet chamber 57, and from the outlet chamber 57 the fluid pressure can be exhausted to atmosphere either through the valve guide bore 63 of the piston 48, the valve exhaust opening 72 and the exhaust passage in the piston 79 or through the valve exhaust passage 45 and the exhaust port 40. At the same time, the wheel brake assemblies associated with the motors 13 are also de-energized by exhausting fluid pressure from said motors through the conduit 12, the outlet port 34 into the outlet chamber 81, and from said outlet chamber the fluid pressure can be exhausted to atmosphere either through the exhaust passage 85 in the piston 79 or through the valve exhaust opening 72, the valve guide bore 63 of the piston 48, the outlet chamber 57, and the valve exhaust opening 45 to the exhaust port 40.

Since the additive effective areas $A_2$, $A_3$ are substantially equal to and opposite the effective area $A_1$, it is apparent that the above-described braking application resulted in a substantially 1:1 ratio between the fluid pressure of the established flow in the branches or flow passages 2 and 3.

In other words, the fluid pressure of the flow established in the branch 2 and applied to the outlet and ratio chambers 57 and 75 acted on the piston 48 in opposition to the established flow in the branch 2 having a fluid pressure substantially equal to that of the branch 3 acting in the outlet chamber 81 on the pistons 48 and 79. If the operator desires to reduce the fluid pressure of the flow established in the branch 2 so that the ratio between branches 2, 3 is less than 1:1, the hand valve 20 is rotated clockwise (in the direction of the arrow) to a position aligning passage means 23 between the port 22 and the exhause port 24. In this manner, pressure fluid communication between the ratio ports 76, 77 is interrupted, and the ratio chamber 75 is vented to atmosphere through the ratio port 76, the conduit 19, and the port, passage means and exhaust port 22, 23 and 24 of the hand valve 20. A manual force applied to the piston 79 effects concert movement of said piston 79 and the piston 48 to actuate the valves 71 and 42 and establish pressure fluid flow through the branches 2 and 3 creating fluid pressures in the outlet chambers 57 and 81, as previously described. The established fluid pressure in the outlet chambers 57 and 81 respectively act on the opposed effective areas $A_2$ and $A_1$ of the piston 48 to create opposed reaction forces on the piston 48; however, since the area $A_1$ is greater than the area $A_2$, a proportionally smaller fluid pressure is established in the outlet chamber 81 to act on the greater area $A_1$. Since the smaller fluid pressure of the established flow in the branch 3 acting on the larger effective area $A_1$ is opposed by the larger fluid pressure of the flow in the branch 2 acting on the smaller effective area $A_2$, it is apparent that the reaction forces across the piston 48 are substantially equal and self-cancelling and that the operator feels only the reaction force on the piston 79 created by the fluid pressure in the outlet chamber 81 acting on the effective area of said piston 79 in opposition to the applied force thereon.

Referring now to FIG. 2, another tandem type control valve 105 is shown connected in the system 1 and functioning therein in substantially the same manner as the previously described control valve 5 with the following exceptions. The control valve 105 is provided with a housing 125 having an axial bore 126 and stepped counterbores 127, 128 therein, said bore forming an inlet chamber. A radially extending wall 129 is integrally formed in the housing 125 between the bore 126 and counterbore 127 having a valve seat 130 thereon in said bore and a piston stop 131 thereon in said counterbore, and a connecting passage 132 extends coaxially through said valve seat between said bore and counterbore. Outlet ports 133, 134 which receive conduits 7, 12, respectively, as previously mentioned, are provided in the housing 125 adjacent the lower ends of the counterbores 127, 128, and a passage 135 connects the counterbore 127 with the outlet port 133. An inlet port 136 which receives the conduit 11, as previously mentioned, is provided in the housing 125 connecting with the counterbore 128 between the outlet port 134 and the open end of said counterbore, and another inlet port 137 which receives the conduit 6, as previously mentioned, is provided in said housing connecting with the bore 126. As will became apparent hereinafter, the inlet and outlet ports 136 and 134 form one separate set of ports, and inlet and outlet ports 137 and 133 form another separate set of ports.

A valve guide member 138 is positioned in the bore 126 against displacement by a snap ring and groove assembly 139 provided adjacent the lower end of said bore, and the lower end of said bore forms an exhaust port 140. The valve guide member 138 is provided with a bore 141 in which an inlet valve element 142 is slidable, and seals 143, 144 are carried by said guide member in sealing engagement with said bore and valve element, respectively. The valve 142 is provided with an axial exhaust opening or passage 145 and has an annular resilient seal or disc 146 on the upper end thereof in circumscribing relation with said exhaust opening. A spring 147 is provided between the guide member 138 and valve 142 normally urging the valve seal 146 into sealing engagement with the valve seat 130 on the housing wall 129.

A piston or valve control member, indicated generally at 148, is provided with a body 149 slidable in the counterbore 127 having an integral radially extending flange 150 slidable in the counterbore 128, said piston being positioned between the port sets 133, 137 and 134, 136. Upper and lower ends 151, 152 of the piston 148 define opposed effective areas $A_1$, $A_2$, and a shoulder 153 on the flange 150 defines an effective area $A_3$ which is the difference between areas $A_1$, $A_2$, said area $A_3$ being opposed to the area $A_1$ and additive to the area $A_2$. Seals 154, 155 are respectively carried in the flange 150 adjacent the upper piston end 151 and in the body 149 adjacent the lower piston end 152 in sealing engagement with the counterbores 128, 127. An outlet or reaction chamber 156 is formed in the counterbore 127 between the housing wall 129 and the lower piston end 152 in open pressure fluid communication with the passage 135 and outlet 133, and said outlet chamber is normally exhausted to atmosphere through the valve exhaust opening 145 and exhaust port 140. The piston body 149 is provided with integral opposed extensions 157, 158 having valve seats 159, 160 on the free ends thereof, respectively. An exhaust bore or passage 161 extends coaxially through the extensions 157, 158 and valve seats 159, 160, and a return spring 162 is interposed between the lower piston end 152 and the housing wall 129 to normally maintain the seat 159 in predetermined spaced relation with the valve 142.

A ratio or control chamber 163 is provided in the counterbore 128 between the side wall thereof and the piston body 149 and between the shoulder formed between counterbores 127, 128 and the piston flange shoulder 153. A ratio or control port 164 which receives one end of the conduit 19, as previously mentioned, is provided in the housing 125 in open pressure fluid communication with the ratio chamber 163 at all times, and another ratio or control port 165 which receives the other end of the conduit 19, as previously mentioned, is provided in the housing 125 in open pressure fluid communication with the outlet chamber 156 at all times.

Another piston or valve control member 166 is provided with a body 167 slidable in the counterbore 128 and having opposed upper and lower ends 168, 169 of substantially equal area. Another return spring 170 is interposed between the upper end 151 of the piston 148 and the lower end 169 of the piston 166 so that the lower end 169 of the piston 166 is normally positioned between the inlet and outlet ports 136 and 134, and an outlet chamber 171 is formed in the counterbore 128 between the lower end 169 of the piston 166 and the upper end 151 of the piston 148 in open pressure fluid communication with the outlet port 124. Seals 172, 173 are carried in the piston body 167 adjacent the lower end 169 thereof and near the mid-portion thereof, respectively, in sealing engagement with the counterbore 128. The piston body 167 is provided with centrally located stepped bores 174, 175, and the stepped bore 174 is connected by a passage 176 with an annular recess 177 provided in the peripheral surface of said piston body between the seals 172, 173, said recess being in open pressure fluid communication with the inlet port 136 at all times. A valve seat 178 is provided in the stepped bore 174, and a connecting passage 179 extends coaxially through said valve seat between said stepped bore and the outlet chamber 171. A valve guide member 180 is positioned in the stepped bore 174 against displacement by a snap ring and groove assembly 181 provided adjacent the upper end of said stepped bore. The guide member 180 is provided with an axial bore 182 in which another inlet valve element 183 is slidable, and seals 184, 185 are carried by said guide member in sealing engagement with said stepped bore and said valve element, respectively. The valve 183 is provided with an axial exhaust opening or passage 186 therethrough, and an annular seal or disc 187 is provided on the lower end of said valve in circumscribing relation with said exhaust opening. A valve spring 188 is biased between the valve guide member 180 and the valve 183 normally urging the valve seal 187 into sealing engagement with the valve seat 178. The return spring 170 normally maintains the valve seal 183 in predetermined spaced relation with the valve seat 160 on the piston 148. An inlet chamber 189 is defined in the stepped bore 174 between the lower end thereof and the guide member 180 and includes the passage 176 and peripheral recess 177.

Another peripheral recess or groove 190 is provided in the piston body 167 between the seal 173 and the upper end 168 of said piston body which is connected with the stepped bore 175 by a cross-passage 191. The peripheral groove 190 is in open pressure fluid communication with an exhaust port 192 provided in the housing 125 and connected with the counterbore 128 adjacent to the upper or open end thereof. To complete the control valve 105, a precompressed metering spring assembly 193 is retained in the stepped bore 175 by a retainer or treadle force receiving plate 194. The plate 194 is slidable in the stepped bore 175 and is normally biased into abutting engagement with a snap ring and groove assembly 195 provided in the upper end of said stepped bore by the compressive force of the metering spring 193.

In the operation of the control valve 105 in the system 1, it is preferred to predetermine substantially simultaneous actuation of the system branches 2, 3 by effecting substantially simultaneous opening or actuation of the valves 142, 183 which respectively control said branches. This is accomplished by substantially balancing the magnitude of the combined forces of the valve and return springs 147, 162 and the seating force of the fluid pressure in the inlet chamber 126 acting to maintain the valve 142 engaged with the seat 130 against the magnitude of the combined forces of the valve and return springs 147, 162 and the seating force of the fluid pressure in the inlet chamber 126 acting to maintain the valve 142 engaged with the seat 130 against the magnitude of the combined forces of the valve and return springs 188, 170 and the seating force of the fluid pressure in the inlet chamber 189 acting to maintain the valve 183 engaged with the seat 178. Assuming that the abovementioned combined forces are equally balanced and that the hand valve 20 is positioned to connect the ratio ports 164, 165 in open pressure fluid communication, as previously described, a manual force applied by the operator on the force receiving plate 194 moves the piston 166 downwardly to engage the valve 183 with seat 160 on the piston extension 158 closing the valve exhaust opening 186 and the exhaust bore 161 in the piston 148 to isolate the outlet chamber 171 from the atmosphere. At the same time, the manual force is transmitted through the return spring 170 to effect concert downward movement of the piston 148 with the piston 166 against the return spring 162 to engage the seat 159 on the piston extension 157 with the valve 142 closing the valve exhaust opening 145 and the exhaust bore 161 of the piston 148 to isolate the outlet chamber 156 from the atmosphere. Further concert downward movement of the pistons 148, 166 effects substantially simultaneous disengagement of the valves 142, 183 from their seats 130, 178 to establish pressure fluid communication between the inlet and outlet ports 137, 133 and 136, 134, respectively. The pressure fluid flows in the branch 2 from the reservoir 4 through the conduit 6, the inlet port 137, the inlet chamber 126, the connecting passage 132, the outlet chamber 156 and passage 135 to the outlet port 133 and therefrom via the conduit 7 into motors 8 which are responsive to rotate slack adjustors 9 and energize the wheel brake assemblies associated therewith. At the same time, the pressure fluid also flows from the outlet chamber 156 through the ratio port 165, the conduit 19, the ports 21, 22 and passage means 23 of the hand valve 20, into the ratio port 164 and therefrom into the ratio chamber 163. Pressure fluid also flows in the branch 3 from the reservoir 10 through the conduit 11, the inlet port 136, the inlet chamber 189, the connecting passage 179, the outlet chamber 171 and the outlet port 134 into the conduit 12 to actuate the motors 13 which, in turn, rotate slack adjustors 14 and energize the wheel brake assemblies associated therewith. The fluid pressure in the ratio chamber 163 acts on the piston area $A_3$ and the fluid pressure in the outlet chamber 156 acts on the additive piston area $A_2$ creating reaction forces substantially equal and opposite to that created by the fluid pressure in the outlet chamber 171 acting on the piston area $A_1$; therefore, the opposed reaction forces acting across the piston 148 are self-cancelling. In this manner, the ratio between the magnitudes of the established fluid pressure in branches 2, 3 is predetermined in a 1:1 ratio since the established fluid pressures in said branches are substantially equal.

When the reaction force created by the established fluid pressure in the outlet chamber 171 acting on the effective area of the piston 166 equals the manually applied force, the piston 166 is moved upwardly against the metering spring 193, and the force of the return spring 162 effects concert upward movement of the piston 148 therewith. This concert upward movement of the pistons 148, 166 positions the valves 142, 183 in lapped engagement with their seats 130, 178 and positions the seats 159, 160 on the piston 148 in lapped engagement with said valves. The reaction force acting through the metering spring 193 against the manually applied force on the plate 194 is substantially equal and opposite thereto and affords the operator an accurate and direct "feel" as to the extent of the braking effort or application. If greater braking effort is desired, the manually applied force is increased which results in an increased application force, and the component parts of the control valve 105 function in the same manner as previously described to again move said component parts to their lapped positions.

When the desired braking effort is attained, the manually applied force is removed from the piston 166, and the return springs 162, 170 and the reaction forces concertly move the pistons 148, 166 upwardly toward their original positions. This concert upward movement of pistons 148, 166 simultaneously disengages the valve 183 from the extension valve seat 160 and disengages the extension valve seat 159 from the valve 142 to re-establish pressure fluid communication between the outlet chambers 156, 171 and the atmosphere. In this manner, the wheel brake assemblies associated with the motors 8 are de-energized by exhausting fluid pressure from said motors through the conduit 7, the outlet port 133, the passage 135, the outlet chamber 156, the valve exhaust opening 145 and the exhaust port 140. At the same time, pressure fluid is also exhausted from the ratio chamber 163 through the ratio port 164, the conduit 19, the ports 22, 21 and passage means 23 of the hand valve 20, and the ratio port 165 into the outlet chamber 156 and therefrom as previously described. The wheel brake assemblies associated with the motors 13 are also simultaneously de-energized by exhausting fluid pressure from said motors through the conduit 12, the outlet port 134, and the outlet chamber 171, the valve exhaust opening 186, the guide member bore 182, the stepped bore 175 and the cross-passage 191 and peripheral groove 190 to the exhaust port 192. Of course, it is obvious that fluid pressure may be exhausted from the outlet chambers 156, 171 through the bore 161 in the piston 148 which communicates with exhaust ports 140, 192.

Since the additive effective areas $A_2$, $A_3$ are substantially equal and opposite to the effective area $A_1$, it is apparent that the above described braking application resulted in a substantially 1:1 ratio between the fluid pressure of the established flow in the branches or flow passages 2, 3. In other words, the fluid pressure of the flow established in the branch 2 and applied to the outlet and ratio chambers 156, 163 acted on the piston 148 in opposition to the established flow in the branch 3 and having a fluid pressure substantially equal to that in the branch 3 which acts in the outlet chamber 171 on the pistons 148, 166. If the operator desires to reduce the fluid pressure of the flow established in the branch 2 so that the ratio between branches 2, 3 is less than 1:1, the hand valve 20 is rotated clockwise (in the direction of the arrow) to a position aligning passage means 23 between the port 22 and exhaust port 24. In this manner, pressure fluid communication between the ratio ports 164, 165 is interrupted, and the ratio chamber 163 is vented to atmosphere through the ratio port 164, the conduit 19 and the ports 22, 24 and passage 23 of the hand valve 20. A manual force applied to the piston 166 effects concrete downward movement of the pistons 148, 166 to actuate valves 142, 183 and establish pressure fluid flow through the branches 2, 3 creating fluid pressures in the outlet chambers 156, 171, as previously described. The established fluid pressure in the outlet chambers 156, 171 respectively act on the opposed effective areas $A_1$, $A_2$ of the piston 148 to create opposed reaction forces thereacross; however, since the area $A_1$ is greater than the area $A_2$, a proportionally smaller fluid pressure is established in the outlet chamber 171 to act on the greater area $A_1$. Since the smaller fluid pressure in the branch 3 acting on the larger effective area $A_1$ is opposed by the proportionally larger fluid pressure in the branch 2 acting on the smaller area $A_2$, it is apparent that the reaction forces across the piston 148 are substantially equal and self-cancelling and that the operator feels only the reaction force on the piston 166 created by the fluid pressure in the outlet chamber 171 acting on the effective area of said piston 166 in opposition to the applied force thereon.

Referring now to FIG. 3, another tandem type control valve 205 is shown connected in the system 1 and functioning therein in substantially the same manner as the previously described control valves 5, 105. The control valve 205 is provided with a housing 225 having axially stepped bores 226, 227 therein, one end of the bore 227 being open and one end of the bore 226 being defined by a radially extending end wall 228 integral with said housing. A cylindrical extension 229 having a valve seat 230 on the free end thereof is integrally formed on the end wall 228 extending coaxially into the bore 226, and an exhaust opening 231 extends coaxially through said extension and valve seat forming an exhaust port in the housing 225. A piston stop 232 is also integrally provided on the end wall 228. The housing 225 is also provided with axially spaced outlet ports 233, 234 which receive conduits 7, 12, as previously mentioned, and connect with the bore 226 adjacent the lower end thereof and with the bore 227 adjacent the upper end thereof, respectively. Axially spaced inlet ports 235, 236 are provided in the housing and connect with the bore 226 adjacent the midportion thereof and between the outlet ports 233, 235, said inlet ports 235, 236 receiving conduits 6, 11, respectively, as previously mentioned. As will become apparent hereinafter, inlet and outlet ports 236, 234 form one separate set of ports and inlet and outlet ports 235, 233 form another separate set of ports.

A piston or valve control member, generally indicated at 237, is provided with a body 238 slidable in the housing bore 226 having integral radially extending flange 239 slidable in the counterbore 227, said piston being positioned between the port sets 234, 236 and 233, 235. Upper and lower ends 240, 240a on the piston 237 define opposed effective areas $A_1$, $A_2$, and a shoulder 241 on the flange 239 defines an effective area $A_3$ which is the difference between areas $A_1$, $A_2$, said area $A_3$ being opposed to area $A_1$ and additive to area $A_2$, and the upper and lower ends 240, 240a of said piston are respectively movable between the port sets 234, 236 and 233, 235. Spaced seals 242, 243, 244 are carried in the piston body 238 in sealing engagement with the housing bore 226, and another seal 245 is carried in the flange 239 in sealing engagement with the housing bore 227. Upper and lower peripheral recesses or grooves 246, 246a are provided in the peripheral surface of the piston body 238 between seals 242, 243 and 243, 244, respectively, said grooves 246, 246a being in open pressure fluid communication with inlet ports 236, 235 at all times. An outlet chamber 247 is formed in the bore 226 between the housing end wall 228 and the piston lower end 240a in open pressure fluid communication with the outlet port 233 and exhaust passage 231.

The piston body 238 is provided with centrally located stepped bores 248, 248a in the upper and lower ends 240, 240a thereof which are connected by passages 249, 249a with the peripheral grooves 246, 246a, and a valve guide bore 250 having seals 251, 251a therein is interposed between the stepped bores 248, 248a. Walls or seating members 252, 252a are positioned against displacement in the stepped bores 248, 248a by snap ring and groove assemblies 253, 253a provided adjacent the upper and lower ends of said stepped bores. Inlet or valve chambers 254, 254a are defined in the stepped piston bores 248, 248a by the walls 252, 252a and include passages 249, 249a and peripheral grooves 246, 246a, said inlet chambers 254, 254a being in open pressure fluid communication with inlet ports 236, 235 at all times. Valve seats 255, 255a are provided on the wall members 252, 252a in the let chambers 254, 254a and connecting passages 256, 256a in said wall members extend coaxially through said valve seats.

Valve elements 257, 257a are slidably received in the upper and lower ends of the valve guide bore 250 in sealing engagement with the seals 251, 251a therein. The valves 257, 257a are provided with axial exhaust openings or passages 258, 258A therethrough, and annular resilient seals or discs 259, 259a are provided on the upper and lower ends of said valves in circumscribing relation with said exhaust openings. Valve springs 260, 260a are biased between the piston body 238 and the valves 257, 257a and normally urge the valve seals 259, 259a into sealing engagement with the seats 255, 255a on the wall members 252, 252a. A return spring 261 is interposed between the housing end wall 228 and the piston lower end 240a and normally maintains the valve seal 259a in predetermined spaced relation with the exhaust valve seat 230 in the housing wall extension 229.

A ratio chamber 262 is provided in the housing bore 227 between the side wall thereof and the peripheral surface of the piston body 238 and between the shoulder formed at the juncture of the stepped housing bores 226, 227 and the piston flange shoulder 241. A ratio or control port 263 which receives one end of the conduit 19, as previously mentioned, is provided in the housing 225 in open pressure fluid communication with said ratio chamber at all times, and another ratio port 264 which receives the other end of the conduit 19, as previously mentioned, is provided in said housing in open pressure fluid communication with the outlet chamber 247.

Another piston or valve control member 265 is slidably received in the upper end of the housing bore 227, and a seal 266 is carried by said piston in sealing engagement with said housing bore. Another outlet or reaction chamber 267 is formed in the housing bore 227 between the upper end 240 of the piston 237 and the piston 265 in open pressure fluid communication with the outlet port 234. The piston 265 is provided with an extension 268 having a valve seat 269 in the lower or free end thereof which is coaxial with the connecting passage 256 in the piston 237, and said valve seat is normally maintained in predetermined spaced relation with the valve seal 259 by a return spring 270 interposed between the upper end 240 of the piston 237 and the piston 265, said return spring normally urging said piston 265 away from said piston 237 toward its normal or inoperative position. An exhaust passage or opening 271 extends coaxially through the valve seat 269 and connects with a stepped bore 272 in the piston 265. To complete the control valve 205, a precompressed metering spring 273 is provided in the piston stepped bore 272 and biased between the piston 265 and a retainer or treadle force receiving plate 274. The plate 273 is slidable in the piston stepped bore 272, and said plate and metering spring 273 are retained against displacement by a snap ring and groove assembly 275 provided adjacent the upper end of said piston stepped bore.

In the operation of the control valve 205 in the system 1, it is preferred to predetermine substantially simultaneous actuation of the system branches 2, 3 by effecting substantially simultaneous opening or actuation of the valves 257, 257a which control said branches. This is accomplished by substantially balancing the magnitude of the combined forces of the valve and return springs 260, 270 and the seating force of the fluid pressure in the inlet chamber 254 acting to maintain the valve 257 engaged with the seat 255 against the magnitude of the combined forces of the valve and return springs 260a, 261 and the seating force of the fluid pressure in the inlet chamber 254a acting to maintain the valve 257a engaged with the seat 255a.

Assuming that the abovementioned combined forces which control the sequence of operation of the valves 257, 257a are substantially balanced and that the hand valve is positioned to communicate the ratio ports 263, 264, as above described, a manual force applied by the operator on the plate 274 of the piston 265 moves said piston downwardly to engage the seat 269 with the valve 257 closing the valve and piston exhaust openings 258, 271 to isolate the outlet chamber 267 from the atmosphere. At the same time, the manual force is transmitted through the return spring 270 to effect substantially simultaneous downward movement of the piston 237 against the return spring 261 to engage the valve 257a with the housing valve seat 230 closing the valve and housing exhaust openings 258a, 231 to isolate the outlet chamber 247 from the atmosphere. Further concert downward movement of the pistons 237, 265 effects substantially concert disengagement of the valves 257, 257a from the valve seats 255, 255a to establish pressure fluid communication between the inlet and outlet ports 236, 234 and 235, 233, respectively. The pressure fluid flows in the branch 2 from the reservoir 4 through the conduit 6, the inlet port 235, the piston inlet chamber 254a, the connecting passage 256a, the outlet chamber 247 and outlet port 233 into the conduit 7 to actuate the motors 8 which, in turn, rotate the slack adjustors 9 to energize the wheel brake assemblies associated therewith. At the same time, the pressure fluid also flows from the outlet chamber 247 through the ratio port 264, the conduit 19, the ports 21, 22 and passage 23 of the hand valve 20, and the ratio port 263 into the ratio chamber 262. Pressure fluid also flows in the branch 2 from the reservoir 10 through the conduit 11, the piston inlet chamber 254, the connecting passage 256, the outlet chamber 267 and the outlet port 234 into the conduit 12 to actuate the motors 13 which, in turn, rotate the slack adjustors 14 to energize the wheel brake assemblies associated therewith. The fluid pressure in the ratio chamber 262 acts on the piston area $A_3$ and the fluid pressure in the outlet chamber 247 acts on the piston area $A_2$ creating reaction forces substantially equal and opposite to that created by the fluid pressure in the outlet chamber 267 acting on the piston area $A_1$; therefore, the opposed reaction forces acting across the piston 237 are self-cancelling. In this manner, the ratio between the magnitudes of the established fluid pressures in branches 2, 3 is predetermined in a 1:1 ratio since the established fluid pressures in said branches are substantially equal.

When the reaction force created by the established fluid pressure in the outlet chamber 267 acting on the effective area of the piston 265 equals the manually applied force, the piston 265 is moved upwardly against the metering spring 273, and the force of the return spring 261 effects concert upward movement of the piston 237 therewith. This concert upward movement of the pistons 237, 265 positions the valves 257, 257a in lapped engagement with their seats 259, 259a and with the seats 269, 230 on the piston and housing extensions 268, 229, respectively. The reaction force acting through the metering spring 273 against the manually applied force on the plate 274 is substantially equal and opposite thereto and affords the operator an accurate and direct "feel" as to the extent of the braking effort or application. If greater braking effort is desired, the manually applied force is increased which results in an increased application force, and the component parts of the control valve 205 function in the same manner as previously described to again move said component parts to their lapped positions.

When the desired braking effort is attained, the manually applied force is removed from the piston 265, and the return springs 261, 270 and the reaction forces concertly move the pistons 237, 265 upwardly toward their original positions. This concert upward movement of the pistons 237, 265 disengages the valve 257a from the housing valve seat 230 and disengages the piston extension valve seat 269 from the 257 to re-establish pressure fluid communication between the outlet chambers 247, 267 and the atmosphere. In this manner, the wheel brake assemblies associated with the motors 8 are de-energized by exhausting fluid pressure from said motors through the conduit 7, the outlet port 233, the outlet chamber 247 and the housing exhaust passage 231. At the same time, the pressure fluid is also exhausted from the ratio chamber 262 through the ratio port 263, the conduit 19, the ports 22, 21 and passage 23 of the hand valve 20 and the ratio port 264 into the outlet chamber 247 and therefrom through the housing exhaust passage 231 to the atmosphere. The wheel brake assemblies associated with motors 13 are also simultaneously de-energized by exhausting fluid pressure from said motors through the conduit 12, the outlet port 234, the outlet chamber 267, and the piston or valve exhaust openings 269 or 258.

Since the additive effective areas $A_2$, $A_3$ are substantially equal and opposite to the effective area $A_1$, it is apparent that the above described braking application resulted in a substantially 1:1 ratio between the fluid pressure of the established flow in the branches or flow passages 2, 3. In other words, the fluid pressure of the flow established in the branch 2 and applied to the outlet and ratio chambers 247, 262 acted on the piston 237 in opposition to the established flow in the branch 3 and having a fluid pressure substantially equal to that in the branch 3 which acts in the outlet chamber 267 on the pistons 237, 265. If the operator desires to reduce the fluid pressure of the flow established in the branch 2 so that the ratio between branches 2, 3 is less than 1:1, the hand valve 20 is rotated clockwise (in the direction of the arrow) to a position aligning the passage 23 between the port 22 and exhaust port 24. In this manner, pressure fluid communication between the ratio ports 263, 264 is interrupted, and the ratio chamber 262 is vented to atmosphere through the ratio port 263, the conduit 19, and the ports 22, 24 and passage 23 of the hand valve 20. A manual force applied to the piston 265 effects concert downward movement of the pistons 237, 265 to actuate the valves 257, 257a and establish pressure fluid flow through the branches 2, 3 creating fluid pressures in the outlet chambers 247, 267, as previously described. The established fluid pressure in the outlet chambers 247, 267 respectively act on the opposed effective areas $A_1$, $A_2$ of the piston 237 to create opposed reaction forces thereacross; however, since the area $A_1$ is greater than the area $A_2$, a proportionally smaller fluid pressure is established in the outlet chamber 267 to act on the area $A_1$. Since the smaller fluid pressure in the branch 3 acting on the larger area $A_1$ is opposed to the proportionally larger fluid pressure in the branch 2 acting on the smaller area $A_2$, it is apparent that the reaction forces across the piston 237 are substantially equal and self-cancelling and that the operator feels only the reaction force on the piston 256 created by the fluid pressure in the outlet chamber 267 acting on the effective area of said piston 265 in opposition to the applied force thereon.

From the foregoing, it is now apparent that novel control means 5, 105 and 205 meeting the objects set out hereinbefore are provided and that changes or modifications as to the precise configurations, shapes and details of the construction set forth in the disclosure by way of illustration may be made by those skilled in the art without departing from the spirit of the invention as defined by the claims which follow.

What I claim is:

1. In a fluid pressure system having a pair of fluid pressure sources and a pair of fluid pressure responsive motors, means for controlling the application of fluid pressure between said sources and motors including a housing, a pair of application means substantially concertly movable in said housing in response to an applied force, means within said housing including said application means providing a pair of pressure fluid flow passages for respective connection with said sources and motors, opposed end portions on one of said application means respectively responsive to fluid pressure applied to said motors, one of said end portions having a lesser pressure fluid responsive area than that of the other of said end portions, an intermediate portion on said one application means between said opposed end portions thereof and defining with said housing a fluid pressure chamber, said intermediate portion having a pressure fluid responsive area substantially equal to the difference between those of said end portions and responsive to fluid pressure in said chamber, said application means being substantially concertly movable in response to the applied force to effect the application of fluid pressure from said sources through said flow passages to said motors, and selectively operable means for connecting said chamber in pressure fluid communication with the atmosphere and with the fluid pressure applied to one of said motors, the applied fluid pressures in said flow passages and acting on said areas of the opposed end portions on said one application means being in a predetermined ratio when said chamber is connected with the atmosphere and in a ratio different than the predetermined ratio when said chamber is connected with the fluid pressure applied to said one motor.

2. A tandem control valve for a dual fluid pressure system comprising a housing, a pair of concertly movable application means in said housing and defining therewith a pair of pressure fluid flow passages, said pair of application means being concertly movable in response to an applied force to positions in said flow passages establishing pressure fluid flow therethrough, opposed end portions on one of said application means respectively responsive to establish fluid pressure in said flow passages, an intermediate portion on said one application means defining with said housing an expansible fluid pressure chamber for selective connection with the atmosphere and with the established fluid pressure in one of said flow passages for opposing one of said end portions, the established fluid pressure in said flow passages being in a predetermined ratio when said chamber is connected with the atmosphere and in ratio different than the predetermined ratio when said chamber is connected with the established fluid pressure in said one flow passage.

3. The tandem control valve according to claim 2 comprising means including selectively operable means connected between said one flow passage and said chamber, said selectively operable means being movable between one position connecting said chamber with the atmosphere and another position for connecting said chamber with the established fluid pressure in said one flow passage.

4. The tandem control valve according to claim 2 comprising a pair of opposed areas on said end portions respectively responsive to established fluid pressure in said pair of flow passages, one of said opposed areas being greater than the other thereof, and an intermediate area on said intermediate portion responsive to fluid pressure in said chamber and substantially equal to the difference between said pair of areas.

5. A tandem control valve for a dual fluid pressure system comprising a housing, a pair of concertly movable valve control members in said housing and defining therewith a pair of pressure fluid flow passages, a pair of valve means in said pair of flow passages and controlling pressure fluid flow therethrough, respectively, said pair of valve control members being movable in response to an applied force to move said pair of valve means to positions in said pair of flow passages establishing pressure fluid flow therethrough, respectively, opposed end portions on one of said valve control members respectively responsive to the established fluid pressures in said pair of flow passages, an intermediate portion on said one valve control member defining with said housing an expansible fluid pressure control chamber for selective connection with the atmosphere and with the established fluid pressure in one of said flow passages for opposing one of said end portions, the established fluid pressure in said pair of flow passages being in a predetermined ratio when said chamber is connected with the atmosphere and in a ratio different than the predetermined ratio when said chamber is connected with the established fluid pressure in said one flow passage.

6. The tandem control valve according to claim 5 including a pair of valve seats on said housing and said one valve control member in circumscribing relation with said pair of flow passages, respectively, said pair of valve means being normally urged into engagement with said pair of valve seats to interrupt pressure fluid flow through said pair of flow passages and being moved to positions disengaged from said pair of valve seats to provide pressure fluid flow through said pair of flow passages in response to the applied force movement of said pair of valve control members.

7. The tandem control valve according to claim 5 including a pair of valve seats on said one valve control member in circumscribing relation with said pair of flow passages, respectively, said pair of valve means being normally urged into engagement with said pair of valve seats to interrupt pressure fluid flow through said pair of flow passages, another pair of valve seats on said housing and the other of said valve control members for operative engagement with said pair of valve means, the applied force movement of said pair of valve control members serving to initially engage said other pair of valve seats and said pair of valve means and thereafter disengage said pair of valve means from said first named pair of valve seats to establish pressure fluid flow through said pair of flow passages, respectively.

8. The tandem control valve according to claim 5 comprising a pair of valve seats on said housing and on the other of said valve control members in circumscribing relation with said pair of flow passages, said pair of valve means being normally urged into engagement with said pair of valve seats to interrupt pressure fluid flow through said pair of flow passages, another pair of valve seats on said one valve control member for operative engagement with said pair of valve means, the applied force movement of said pair of valve control members serving to initially engage said other pair of valve seats and said pair of valve means and thereafter disengage said pair of valve means from said first named pair of valve seats to establish pressure fluid flow through said pair of flow passages, respectively.

9. The tandem control valve according to claim 5 including selectively operable means connected between said one flow passage and said chamber and movable between one position interrupting pressure fluid communication between said chamber and said one flow passage and connecting said chamber with the atmosphere and another position connecting said chamber in pressure fluid communication with said one flow passage.

10. The tandem control valve according to claim 5 wherein said opposed end portions are provided with opposed differential fluid pressure responsive areas, and an intermediate fluid pressure responsive area on said intermediate portion substantially equal to the difference between said opposed differential areas.

11. The tandem control valve according to claim 5 comprising a pair of sets of ports in said housing, each port set including inlet and outlet ports, said pair of flow passages being connected between the inlet and outlet ports of said port sets, respectively, and said one valve control member being movable in said housing between said port sets.

12. The tandem control valve according to claim 11 wherein said one valve control member defines with said housing a first inlet chamber in pressure fluid communication with the inlet port of one of said port sets, a first outlet chamber in said housing between said pair of valve control members in pressure fluid communication with the outlet port of said one port set, a first connecting passage in said one valve control member between said first inlet and outlet chambers, a first valve seat on said one valve control member in circumscribing relation with said first connecting passage, one of said valve means being normally urged into engagement with said first valve seat to interrupt pressure fluid communication between the inlet and outlet ports of said one port set, a second inlet chamber in said housing in pressure fluid communication with the inlet port of the other of said port sets, said one valve control member defining with said housing a second outlet chamber in pressure fluid communication with the outlet port of said other port set, a second connecting passage in said housing between said second inlet and outlet chambers, said first inlet and outlet chambers and connecting passage and said second inlet and outlet chambers and connecting passage respectively defining said pair of flow passages, the opposed end portions of said one valve control member being respectively responsive to established fluid pressure in said first and second outlet chambers and said control chamber being adapted for selective connection with one of said first and second outlet chambers, a second valve seat on said housing in circumscribing relation with said second connecting passage, the other of said valve means being normally urged into engagement with said second valve seat interrupting pressure fluid communication between the inlet and outlet ports of said other port sets, and third and fourth valve seats on said pair of valve control members for operative engagement with said one and other valve means, said third and fourth valve seats being moved into engagement with said one and other valve means in response to the initial applied force movement of said pair of valve control members and said pair of valve control members being thereafter further movable to disengage said one and other valve means from said first and second valve seats to open said first and second connecting passages and establish pressure fluid communication between the inlet and outlet ports of said one and other port sets, respectively.

13. The tandem control valve according to claim 11 comprising a first inlet chamber in said housing and connected with the inlet port of one of said port sets, said one valve control member defining with said housing a first outlet chamber connected with the outlet port of said one port set, a first connecting passage in said housing between said first inlet and outlet chambers, a first valve seat in said housing in circumscribing relation with said first connecting passage, one of said valve means being normally urged into engagement with said first valve seat interrupting pressure fluid communication between the inlet and outlet ports of said one port set, a second outlet chamber defined in said housing between said pair of valve control members and connected with the outlet port of the other of said port sets, the other of said valve control members defining with said housing a second inlet chamber connected with the inlet port of said other port set, a second connecting passage in said other valve control member between said second inlet and outlet chambes, said first and second inlet and outlet chambers and said first and second connecting passages respectively defining said pair of flow passages, the opposed end portions of said one valve control member being respectively responsive to fluid pressure in said first and second outlet chambers and said control chamber being adapted for selective connection with one of said first and second outlet chambers, a second valve seat on said other valve control member in circumscribing relation with said second connecting passage, the other of said valve means being normally urged into engagement with said second valve seat interrupting pressure fluid communication between the inlet and outlet ports of said other port set, and opposed third and fourth valve seats on said one valve control member for operative engagement with said one and other valve means, said third and fourth valve seats being engaged with said one and other valve means upon initial applied force movement of said pair of valve control members and said pair of valve control members being thereafter further movable to effect disengagement of said one and other valve means from said first and second valve seats thereby opening said first and second connecting passages and establishing pressure fluid communication between the inlet and outlet ports of said one and other port sets, respectively.

14. The tandem control valve according to claim 11 wherein said one valve control member defines with said housing first and second inlet chambers respectively connected with the inlet ports of said port sets, a first outlet chamber defined in said housing between said pair of valve control members and connected with the outlet port of one of said port sets, said one valve control member also defining with said housing a second outlet chamber connected with the outlet port of the other of said port sets, first and second connecting passages in said one valve control member between said first and second inlet and outlet chambers, respectively, said first and second inlet and outlet chambers and connecting passages respectively defining said pair of flow passages, the opposed end portions of said one valve control member being respectively responsive to fluid pressure in said first and second outlet chambers and said control chamber being adapted for selective connection with one of said first and second outlet chambers, first and second valve seats on said one valve control member in circumscribing relation with said first and second connecting passages, said pair of valve means being normally urged into engagement with said first and second valve seats interrupting pressure fluid communication between the inlet and outlet ports of said one and other port sets, respectively, a third valve seat on said housing in said second outlet chamber for operative engagement with one of said valve means and a fourth valve seat on the other of said valve control members in said first outlet chamber for operative engagement with the other of said valve means, said third and fourth valve seats being engaged with said one and other valve means upon initial applied force movement of said pair of valve control members and said pair of valve control members being thereafter further movable to effect disengagement of said one and other valve means from said first and second valve seats thereby opening said first and second connecting passages and establishing pressure fluid communication between the inlet and outlet ports of said one and other port sets, respectively.

References Cited by the Examiner

UNITED STATES PATENTS

| | | | |
|---|---|---|---|
| 2,062,500 | 12/36 | Cosler | 303—6 |
| 3,003,825 | 10/61 | Kemble | 303—54 |

FOREIGN PATENTS

| | | |
|---|---|---|
| 1,183,209 | 7/59 | France. |
| 732,959 | 6/55 | Great Britain. |
| 768,583 | 2/57 | Great Britain. |
| 798,816 | 7/58 | Great Britain. |
| 529,739 | 7/54 | Belgium. |

ARTHUR A. La POINT, *Primary Examiner.*

EUGENE G. BOTZ, *Examiner.*